United States Patent [19]

Dolle

[11] 4,249,994
[45] Feb. 10, 1981

[54] METHOD FOR UNCLOGGING AN ELECTROMAGNETIC FILTER AND AN INSTALLATION FOR CARRYING OUT SAID METHOD

[75] Inventor: Lucien Dolle, Palaiseau, France

[73] Assignee: Commissariat a l'Energie Atomique, Paris, France

[21] Appl. No.: 766,675

[22] Filed: Feb. 8, 1977

[30] Foreign Application Priority Data

Feb. 19, 1976 [FR] France .................... 76 04646

[51] Int. Cl.³ .................... G21C 19/32; B10D 35/06
[52] U.S. Cl. .................... 176/37; 210/222
[58] Field of Search .................... 176/37; 210/222

[56] References Cited

U.S. PATENT DOCUMENTS

| | | | |
|---|---|---|---|
| 3,539,509 | 11/1970 | Heitmann et al. | 210/222 |
| 3,567,026 | 9/1968 | Kolm | 210/222 |
| 3,887,457 | 6/1975 | Marston | 210/222 |
| 3,894,391 | 7/1975 | Heitmann | 176/37 |
| 3,972,772 | 8/1976 | Heitmann | 176/37 |
| 4,043,864 | 8/1977 | Heitmann | 176/37 |
| 4,054,513 | 10/1977 | Windle | 210/222 |

*Primary Examiner*—Samuel W. Engle
*Assistant Examiner*—Edward F. Miles
*Attorney, Agent, or Firm*—Lane, Aitken, Ziems, Kice & Kananen

[57] ABSTRACT

An electromagnetic filter of the type provided with a magnetizable packing and placed in the water circuit of a nuclear reactor is cleaned by a method which first consists in isolating the filter from the circuit, then subjecting it to a series of washing and draining-off cycles. The washing operation consists in withdrawing a fraction of water from the circuit and introducing it substantially at the temperature and pressure of withdrawal and under such conditions as to impart turbulent flow to the water within the packing. The draining-off operation consists in discharging the wash water contained in the filter.

1 Claim, 4 Drawing Figures

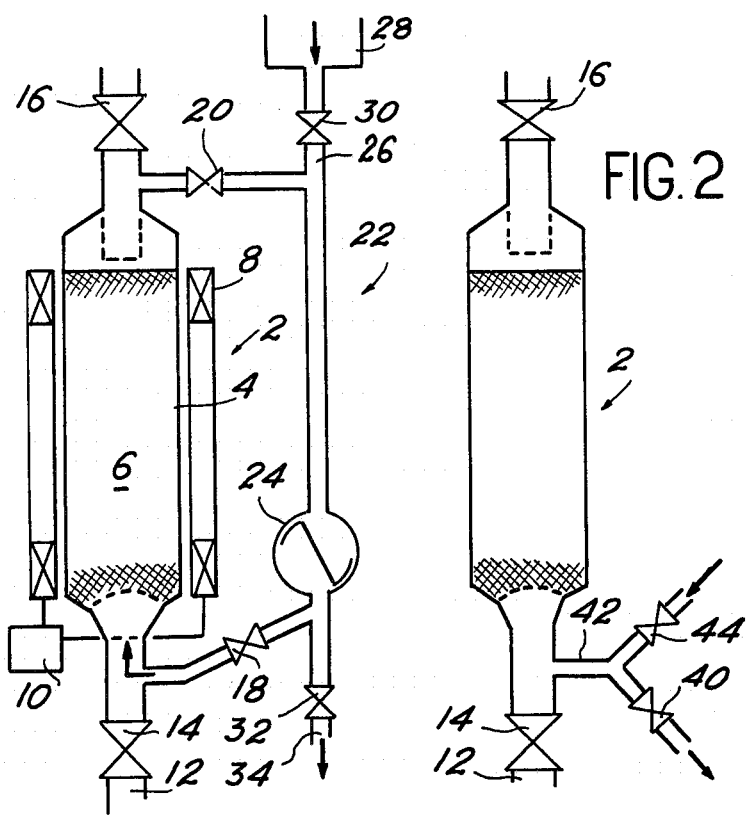
FIG. 1
FIG. 2
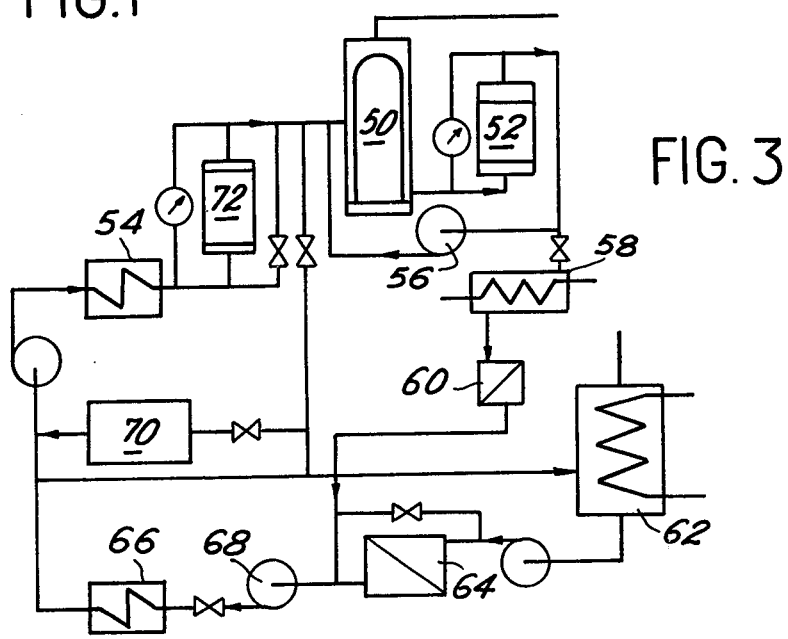
FIG. 3

METHOD FOR UNCLOGGING AN ELECTROMAGNETIC FILTER AND AN INSTALLATION FOR CARRYING OUT SAID METHOD

This invention relates to a method for unclogging an electromagnetic filter and to an installation for carrying out said method.

It is known that an electromagnetic filter is essentially constituted by a casing of non-magnetic material filled with a magnetizable packing and placed within the interior of a winding. The passage of an electric current in the winding results in the appearance of a magnetic field which has the effect of magnetizing the packing. The packing can be fixed in the form of padding, of woven steel-wire fabric or of a stack of grids. In the majority of instances, however, the packing is formed by a bed of steel beads.

The application of a magnetic field to the packing beads results in magnetization of these latter and correlatively in the appearance of high magnetic-field gradients in the spaces between beads.

When a fluid charged with ferromagnetic impurities passes through the bed of beads which have thus been magnetized, the impurities are transferred from the zones of low magnetic field to the zones of high magnetic field, that is to say towards the magnetic poles of the beads. The action of the magnetic forces is such that the ferromagnetic impurities adhere to the beads and the packing thus performs the function of a filter.

The use of electromagnetic filters of this type has already been contemplated for a large number of installations and especially nuclear reactors in which they can be installed either in the primary circuits or in the secondary circuits.

This use in nuclear reactors is described in particular in French Pat. No. 72 25870 filed on July 18, 1972 and entitled "Water treatment installation for steam generators in nuclear power plants of the pressurized-water reactor type " and in French Pat. No. 72 45355 filed on Dec. 20, 1972 and entitled "Water purification device for a nuclear power plant of the pressurized-water reactor type."

In order to unclog a filter of this type, the operation is performed as follows. The first step consists in isolating the filter from the installation in which it is inserted. This operation is performed by closing valves. The packing is then demagnetized by applying a low-frequency alternating-current voltage to the terminals of the winding, the amplitude of said voltage being such as to decrease progressively to zero. Finally, a stream of liquid derived from a wash duct which is independent of the water circulation systems of the nuclear reactor is passed into the filter in order to wash the latter. This upwardly flowing liquid stream dislocates the bed of beads which accordingly undergo disordered motion during which they come into collision with each other many times. This has the effect of detaching the clogging products which are carried away by the wash liquid. On completion of this operation, the beads fall back into position at the bottom of the filter and reconstitute the bed, simply under the action of gravity. The bed of beads is then remagnetized and the filter is ready to be used again. This unclogging operation lasts a few minutes approximately. In known methods of this type, the wash water is not withdrawn from the primary (or secondary) circuit of the nuclear reactor and, in general, is therefore neither at the temperature nor at the pressure of the water which circulates within said circuit. Moreover, the unclogging operation takes place by means of a stream of water which has essentially a continuous character and is circulated upwards within the filter.

Methods of the type described are subject to a large number of disadvantages.

The first disadvantage arises from the fact that they call for a very large quantity of wash water which, in the case of each regeneration, is of the order of 1% of the hourly quantity of water treated by the filter. By way of explanation in the case of a filter which is capable of treating 1000 metric tons of water per hour, 15 metric tons of water are required in order to effect unclogging of the filter by means of a method of the prior art. It is therefore impossible by means of this method to withdraw such a large quantity of water from the nuclear reactor circuit over a short period of time. For this reason, it is necessary to have recourse to an auxiliary source connected to the filter by means of a wash water supply duct.

This need to make use of a large quantity of water further leads to two difficulties: in the event that the filter is placed in the primary circuit of a nuclear reactor, the effluents discharged from the filter are radioactive and represent a large quantity of water to be treated, thus constituting an appreciable capital investment in the exploitation of the reactor. In the event that the filter is placed in the secondary circuit of a nuclear reactor, the water employed in this filter is usually conditioned and especially de-aerated and the need to employ a large volume of water is again objectionable in this case.

The second disadvantage arises from the temperature difference observed in methods of the prior art between the filtering stage and the unclogging stage. The wash water is usually at a lower temperature than that of the water circulated within the nuclear reactor circuit. Unclogging therefore calls for a reduction in temperature at the beginning of the cycle followed by an increase in temperature at the end of the cycle; the length of the unclogging operation is increased accordingly. As a secondary consideration, it can be observed that the steels constituting the beads which form the filter bed are usually liable as a result of chemical corrosion to form products of corrosion in a different form and especially in a less magnetizable form. In consequence, it is also an advantage from this point of view to carry out washing of the filter at a temperature which is as high as possible.

The present invention overcomes the foregoing disadvantages in that it proposes a method of unclogging which calls for the use of a much smaller quantity of wash water than the quantity employed in methods of the prior art. This permits withdrawal of said water from the nuclear reactor circuit and therefore the introduction of the water into the filter substantially at the temperature and pressure of withdrawal since the unclogging operation takes place in a series of washing and draining-off cycles and not by means of a continuous flow of wash water as in the prior art.

By way of explanation, when the method in accordance with the invention is employed in the case of a filter which is capable of treating 1000 metric tons of water per hour it is possible to unclog the filter with only 3 to 4 tons of water instead of the 15 tons which were required by the methods of the prior art. This small quantity of water can accordingly be withdrawn from the water circuit of the nuclear reactor (namely either the primary or secondary circuit); in consequence, the filter receives water to be filtered and wash water which are substantially at the same temperature and at the same pressure.

In the wash cycles which take place in accordance with the method of the invention, the bed of beads undergoes successive displacements of small amplitude with a sufficiently high degree of efficacy to dispense with any need to cause complete dislocation of the bed of beads within a relatively large free internal space provided at the bottom of the filter. It is therefore always possible to employ a filter which is packed to practically the full height of this latter, as was not the case with methods of washing in the prior art.

So far as the installation is concerned, the invention finally provides further advantages which are related in particular to elimination of the wash duct and of the auxiliary source of wash water. This modification of the technology of the installation results in a reduction of capital cost of this latter.

In more exact terms, the present invention is therefore directed to a method for unclogging an electromagnetic filter having a magnetizable packing and placed in a water circuit of a nuclear reactor. The method essentially consists first in isolating the filter from the circuit, then in subjecting the filter to a series of washing and draining-off cycles. The washing operation consists in withdrawing from said circuit a fraction of the water which is circulated therein and in introducing said water into the filter substantially at the temperature and pressure of withdrawal and under such conditions as to impart turbulent flow motion to said water within the packing. The draining-off operation consists in discharging the wash water contained in the filter.

It is preferably ensured that, when the filter is placed in the primary circuit of a nuclear reactor of the pressurized-water type, unclogging takes place at a temperature within the range of 200° C. to 300° C.

It is also preferably ensured that the pressure of the water employed for the unclogging operation is within the range of 100 to 160 bar.

When the filter is placed in the primary circuit of a pressurized-water reactor comprising a pressurizer, withdrawal of the wash water is preferably carried out within said pressurizer.

The invention is also concerned with an installation for the practical application of the method hereinabove defined and for unclogging an electromagnetic filter of the magnetized-packing type, said filter being placed in the water circuit of a nuclear reactor. The installation essentially comprises means for isolating said filter from the circuit, means whereby part of the water which circulates in said circuit is withdrawn therefrom, means for introducing the water into the filter substantially at the temperature and pressure of withdrawal under conditions which impart turbulent flow motion to said water within the packing, and means for discharging the wash water contained in the filter.

In a first alternative embodiment, the installation comprises a closed wash circuit constituted by an accelerating pump connected at the upstream end by means of a pipe fitted with a valve to the top portion of the filter and at the downstream end by means of a pipe fitted with a valve to the bottom portion of said filter, said circuit being connected at the top portion thereof to the water circuit of the nuclear reactor by means of an introduction valve end and at the bottom portion thereof to an effluent tank by means of a drain-off valve.

In a second alternative embodiment, the installation comprises a water admission duct which connects the bottom portion of the filter to the water circuit of the nuclear reactor by means of a water introduction valve and a drain-off pipe which is connected to the bottom portion of the filter and is fitted with a drain-off valve.

When the filter is placed in the primary circuit of a nuclear reactor of the pressurized-water type comprising a pressurizer, the installation comprises a pipe connected to said pressurizer and a valve placed in said pipe.

When the filter is placed in the secondary circuit of a pressurized-water reactor, said circuit being equipped with at least one high-pressure heater followed by a steam generator, the filter is accordingly placed between said high-pressure heater and said steam generator.

It is preferably ensured that the magnetizable packing is constituted by a bed of beads.

The distinctive features and advantages of the invention will in any case become more readily apparent from the following description of exemplified embodiments which are not given in any limiting sense, reference being made to the accompanying drawings, wherein:

FIG. 1 illustrates the first alternative embodiment of the method of unclogging in accordance with the invention in which use is made of an accelerating pump placed in a closed circuit;

FIG. 2 illustrates the second alternative embodiment of the method according to the invention, in which the draining-off operation takes place by direct expansion;

FIG. 3 illustrates the installation for the application of the method when the filter is placed in the secondary circuit of a nuclear power plant of the pressurized-water reactor (PWR) type;

Figure 4:
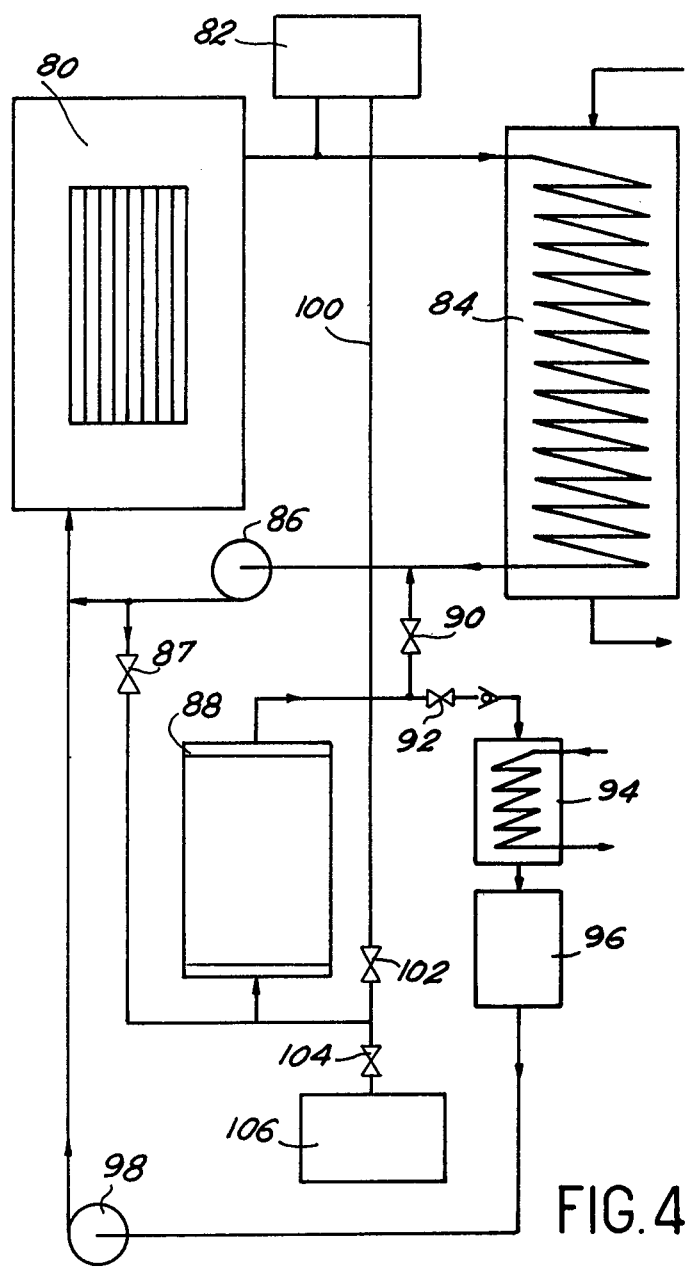
FIG. 4 illustrates the installation when the filter is placed in the primary circuit of a reactor of this type.

In FIG. 1, the electromagnetic filter is designated by the reference 2. As shown diagrammatically, said filter comprises a casing 4 filled with a packing 6 and placed within a winding 8 which is supplied from a voltage source 10. The constructional details of this electromagnetic filter are already known and do not form part of the invention. The winding 8 can be constituted by a single winding or by a stack of discs which are supplied in parallel, for example. The filter 2 is placed in a duct 12 through which the liquid to be filtered is circulated. By way of example, said duct can form part of the primary circuit of a nuclear reactor. Valves 14 and 16 serve to isolate the filter from the duct 12. Valves 18 and 20 serve to connect the filter to a loop circuit 22. This circuit comprises an accelerating pump 24 and is connected by means of a pipe 26 to a source 28 of hot water under pressure through a valve 30. By way of example, the source 28 can be the primary circuit of a nuclear reactor or alternatively the pressurizer of said circuit as will become more readily apparent in connection with FIG. 4. A drain-off valve 32 is placed at the lower end of the accelerating pump 24 in a discharge duct 34 which is connected to cooling devices and to effluent tanks (not shown in the figure).

The operation of this installation is as follows: in order to carry out unclogging of the filter 2, the main valves 14 and 16 are first closed. The magnetizable packing 6 is then demagnetized by applying a low-frequency current to the winding 8 in known manner, the amplitude of said current being progressively reduced to zero. The valves 18 and 20 of the unclogging circuit are then opened as well as the valve 30 in order to permit the addition of hot water under pressure which is delivered by the means 28. The pump 24 is then started up whilst the valve 30 can remain open if this is permitted by the conditions of pressure within the circuit or can be closed. The output of the pump is so adjusted as to ensure that the liquid which flows into the filter attains a velocity which is just sufficient to cause lifting of the bed of beads when no magnetic field is present.

The drain-off valve 32 is opened several times in succession. Each time this valve is opened, a fraction of the unclogging sludges is discharged by expansion through the duct 34. Each opening of the valve 32 causes at the same time a reduction in flow velocity of the liquid, with the result that the bed of beads is deposited and comes to rest on the bottom of the filter. Conversely, each time the valve 32 is closed, the bed of beads moves upwards under the action of the increase in flow velocity of the liquid circulated within the filter.

The succession of opening and closing movements of the valve 32 thus causes the bed of beads to undergo a succession of movements of small amplitude and in turn gives rise to unclogging and washing-out of the sludges. After a few cycles of washing and draining-off operations, the filter is finally cleared to a sufficient extent to be put back into service.

This recommissioning of the filter is carried out by closing the valves 18 and 20, by restoring the magnetizing field and finally by opening the main valves 14 and 16.

While the alternative embodiment of the method of unclogging in accordance with the invention which has just been described proves satisfactory in the majority of cases, a disadvantage does nevertheless arise from the need for an accelerating pump (namely the pump 24 shown in FIG. 1), the operating regime of which may be affected by contamination of the wash water, especially if this water contains a high concentration of metal oxide sludges. In the second alternative embodiment which is illustrated in FIG. 2, said accelerating pump is dispensed with.

In FIG. 2, the filter (the illustration of which is simplified) is again designated by the reference 2 and mounted in a duct 12 from which it can be isolated by means of main valves 14 and 16. A drain-off valve 40 is placed at the lower end of a Y-shaped pipe 42, the upper end of which contains an introduction valve 44.

The operation of the installation described above is as follows: unclogging of the filter 2 first consists in carrying out the operations already described in connection with the alternative embodiment of FIG. 1, namely demagnetization of the packing followed by isolation of the filter by closure of the main valves 14 and 16. Since the valve 44 remains closed, the drain-off valve 40 is then opened so as to empty the filter by expansion through cooling devices which are not shown in the figure. A part of the metal oxides retained in the filter packing is then carried away. Stopping of the draining-off process is carried out by closing the valve 40 when the filter finally contains steam alone. The valve 44 is then opened so as to allow the wash water to penetrate into the filter. This water is withdrawn for example from the main circuit of the reactor in which the filter is located, or alternatively from the pressurizer as will be more readily apparent from a study of FIG. 4. This introduction of water into the filter takes place abruptly since the water undergoes sudden expansion from the pressure of the primary circuit (which can be of the order of 150 bar, for example) to the pressure of the steam remaining within the filter (which is usually lower than 100 bar). There accordingly results a turbulent flow motion of the injected water which is imparted to the beads and causes mechanical separation of the sludges.

The turbulent flooding thus produced is immediately followed by further draining-off, this being produced by closing the valve 44 and opening the valve 40. As in the preceding alternative embodiment, this cycle of operations is repeated a number of times. After a few cycles (4 or 5), the filter is regenerated to a sufficient extent to be put back in circuit for further operation. The valves 40 and 44 are then closed, the magnetizing field is restored and the main valves 14 and 16 are opened.

In this alternative embodiment, it is not necessary to ensure that the packing is set in motion in order to produce effective detachment of corrosion products; this form of the method is therefore equally applicable to packings of different types, especially the fixed packings which were mentioned earlier.

When this variant of the method of unclogging is applied to a filter which is mounted in the secondary circuit of a nuclear reactor, it is preferable in order to obtain a high degree of turbulence of the water to ensure that the residual vapor pressure within the filter is lower than the water pressure of the secondary circuit.

The two variants of the method which have just been described apply to any electromagnetic filter which is placed in one of the circuits of a nuclear power plant. By way of explanation, an installation fitted with filters of this type is illustrated in FIGS. 3 and 4, said filters being placed respectively in the secondary and primary circuits.

In the installation which is illustrated in FIG. 3, two filters are placed in the secondary circuit of a pressurized-water reactor. These filters are employed for filtration of condensates downstream of the high-pressure heaters and for filtration of the purge water flow in a steam generator, the temperature of which is of the order of or higher than 260° C.

The steam generator 50 is purged with a flow at a rate within the range of 1% to 1.5% of the supply flow rate. The purge flow is filtered directly within a first electromagnetic filter 52 and is reinjected into the steam generator with the water of the high-pressure heaters 54 by means of a pump 56. However, a fraction is withdrawn and cooled within a heat-exchanger 58, then directed into the demineralizer 60 which consists of a mixed bed of ion-exchange resins, at a temperature of 50° C. This fraction is then directed into the condensate circuit towards the heaters. The condensates from the condenser 62 are demineralized on the ion-exchange resins 64 and directed to the low-pressure heaters 66 by a pump 68. The condensates are then directed with the make-up water derived from the feedwater tank 70 to the high-pressure heaters 54. The water which is heated to the injection temperature within the steam generator 50 is filtered by means of a second electromagnetic filter 72, with the result that the undissolved corrosion products (the heaters are one of the main sources of said products in the condensate circuit) are retained by the filter 72 before finally reaching the steam generator 50.

The circuit is completed by a certain number of valves which need not be described in detail since an installation of this type is known to anyone versed in the art.

In the installation which is illustrated in FIG. 4, the electromagnetic filter is placed in the primary circuit of a pressurized-water reactor. The reactor core which is shown diagrammatically is designated by the reference 80; the primary circuit comprises a pressurizer 82, a steam generator 84, a circulating pump 86. The filter 88 receives through the valve 87 the water which is taken from the discharge side of the pump 86, the temperature of the water being about 300° C. The rate of withdrawal can vary between 1% and 10% of the nominal flow rate within the loop constituted by the reactor core, the pump and the steam generator. The water discharged from the filter 88 is reinjected into the suction side of the pump through the valve 90 but a fraction can be withdrawn and directed through the valve 92, first towards a heat-exchanger 94 which cools the water to 50° C. and then to a mixed bed of ion-exchange resins 96 for separating ionic impurities and any fission products which may be present. The extent of the above-mentioned withdrawal can be adjusted as a function of the ionic purity of the water of the primary circuit; said withdrawal is usually of the order of 0.1% of the nominal flow rate within a primary loop. After passing through the mixed bed 96 of resins, the water is reinjected into the primary circuit by means of a circulating pump 98.

The circuit for unclogging the filter 88 comprises a pipe 100 which connects the pressurizer 82 to said filter by means of an introduction valve 102. A drain-off valve 104 connects the lower end of the filter to an effluent tank 106. In order to carry out unclogging of the filter, the packing is demagnetized and the filter is then isolated by closing the valves 87 and 90. The drain-off valve 104 is then caused to open so that the contents of the filter are discharged from the lower end of this latter to the effluent tank. The draining-off operation is stopped by closing the valve 104. The valve 102 is then caused to open in order to enable the water withdrawn from the pressurizer 82 to carry out a washing operation at the pressure and temperature of withdrawal (subject to pressure and temperature drops). Washing is followed by a further bottom-draining as a result of closure of the valve 102 and opening of the valve 104. It will be observed that the general arrangement of an installation of this type dispenses with the need for the wash water duct and auxiliary source while providing a direct connection between the wash pipe and the primary circuit as well as draining of the filter from the lower end, which are essential features of the unclogging installation in accordance with the invention.

What we claim is:

1. A method for cleaning an electro-magnetic filter containing a magnetizable packing located in a water circulatory loop of a nuclear reactor by subjecting the packing to a series of washing and draining cycles of wash water withdrawn from said circulatory loop, said method comprising the steps of:
    (a) isolating the filter from the water circulatory loop of the reactor and draining the water so as to empty the filter which contains then only steam;
    (b) withdrawing a fraction of the water being circulated in the isolated circulatory loop for use as wash water for said filter;
    (c) introducing said wash water into said filter at a temperature within the range of 200° C. to 300° C. and at a pressure within the range of 100 to 160 bar so that a sudden expansion of said water occurs in the filter;
    (d) completely draining the wash water introduced into the filter through a bottom portion of the filter, so as to empty the filter which contains then only steam;
    (e) repeating the withdrawing, introducing and draining steps several times in succession so as to subject the packing of said filter to a series of washing and draining cycles in order to completely clean said filter.

* * * * *